United States Patent [19]
Zinnes et al.

[11] 3,714,155
[45] Jan. 30, 1973

[54] 4-HYDROXY-2,N-DIMETHYL-2H-1,2-BENZOTHIAZINE-3-CARBOXANILIDE1,1-DIOXIDE AND PROCESS THEREFOR

[75] Inventors: Harold Zinnes, White Meadow Lake, Rockaway; Neil A. Lindo, Chatham; John Shavel, Jr., Mendham, all of N.J.

[73] Assignee: Warner-Lambert Company, Morris Plains, N.J.

[22] Filed: Sept. 27, 1971

[21] Appl. No.: 184,193

[52] U.S. Cl. ............................. 260/243 R, 424/246
[51] Int. Cl. .................................... C07d 93/02
[58] Field of Search ........................... 260/243 R

[56] References Cited

UNITED STATES PATENTS 3,646,020   2/1972   Zinnes et al. .......................... 260/243

Primary Examiner—John M. Ford
Attorney—Albert H. Graddis et al.

[57] ABSTRACT

A compound of the formula is disclosed:

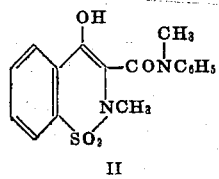

This compound is prepared as follows:

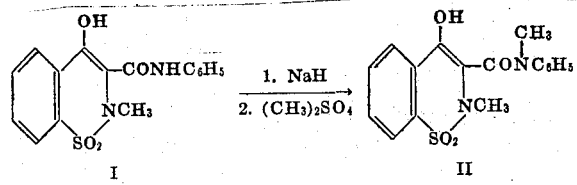

It is useful as an anti-inflammatory agent.

3 Claims, No Drawings

4-HYDROXY-2,N-DIMETHYL-2H-1,2-BENZOTHIAZINE-3-CARBOXANILIDE 1,1-DIOXIDE AND PROCESS THEREFOR

The present invention relates to 4-hydroxy-2,N-dimethyl-2H-1,2-benzothiazine-3-carboxanilide 1,1-dioxide having the following structural formula:

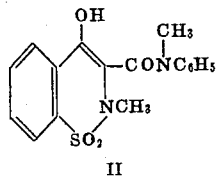

II

The above compound is useful as an anti-inflammatory agent. When administered orally or intraperitoneally to mammals, such as rats, in doses of 100 to 250 mg/kg, it reduces the swelling of the paw induced by injection into the foot pads of an irritant such as carrageenin.

Accordingly, the compound of this invention is indicated in conditions such as arthritis in a mammal such as cats, dogs, monkeys, and the like. A dosage regimen of 100 to 250 mg/kg orally or by injection several times a day is recommended. This dosage regimen can be varied in accordance with age, weight and severity of the condition being treated.

In order to use this compound, it is formulated into dosage forms commonly used in oral or in parenteral administration. These include, e.g., tablets, capsules, suspensions, solutions for injection, and the like. These formulations are prepared by mixing the active ingredient with pharmaceutical excipients such as lactose, dicalcium phosphate and sterile water and compounded by methods well known to the pharmacist's art to give final forms containing 100 to 250 mg per dosage unit.

According to the present invention, the above compound is prepared in accordance with the following reaction scheme:

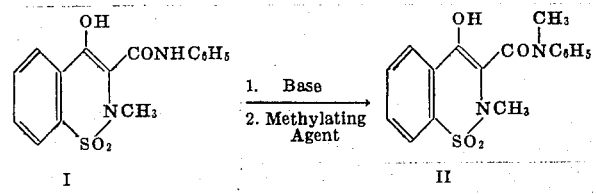

Referring now to the above reaction scheme, a compound of Formula I is converted to the anion by the use of a base and treating the resulting anion with a methylating agent, such as dimethyl sulphate.

The starting Compound I is prepared by treating 2-methyl-2H-1,2-benzothiazine-4-(3H)-one 1,1-dioxide with a base and treating the anion thus obtained with phenylisocyanate.

Among the bases which can be used for the conversion of the above starting materials to their respective anions are alkali metal hydrides such as sodium hydride and Grignard reagents such as isopropylmagnesium halide.

The starting compound for 2-methyl-2H-1,2-benzothiazine-4-(3H)-one 1,1-dioxide is prepared in accordance with the teachings of Zinnes, et al, Journal of Organic Chemistry 31, 162 (1966).

The following examples are included in order further to illustrate the invention.

EXAMPLE 1

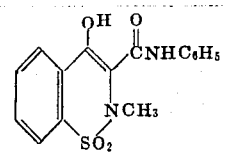

4-Hydroxy-2-Methyl-3-Phenylcarbamyl-2H-1,2-Benzothiazine 1,1-Dioxide

A. Sodium Hydride as the Base

A solution of 31.7 g (0.15 mol) of 2-methyl-2H-1,2-benzothiazin-4(3H)-one 1,1-dioxide in 300 ml of tetrahydrofuran was added dropwise with stirring over a period of 45 minutes to a slurry of 0.17 mol of sodium hydride in 100 ml of tetrahydrofuran, the temperature being maintained at 0° to −5°C. When gas evolution had ceased, a solution of 40 g (0.34 mol) of phenylisocyanate in 100 ml of tetrahydrofuran was added at such a rate that the temperature remained at −5°C. It was then allowed to stand at room temperature for one hour and the solvent was removed in vacuo at room temperature. The residue was poured into 500 ml of ice water, the mixture was filtered, and the filtrate was washed with ether. The aqueous solution was acidified with hydrochloric acid and the resulting precipitate was collected. Recrystallization from ethyl acetate gave 29.6 g of product, m.p. 217° to 218.5°C dec.

Anal. for $C_{16}H_{14}N_2O_4S$:

Calcd: C - 58.18  H - 4.27  N - 8.48  S - 9.71

Found: C - 58.38  H - 4.24  N - 8.62  S - 9.80

B. Grignard Reagent as the Base

The Grignard reagent prepared from 0.8 g of magnesium and 2.6 g of isopropyl chloride in 25 ml of ether was diluted with 25 ml of tetrahydrofuran and a solution of 6.3 g (0.03 mol) of 2-methyl-2H-1,2-benzothiazin-4(3H)-one 1,1-dioxide in 25 ml of tetrahydrofuran was added. The mixture was stirred for 15 minutes, a solution of 3.9 g (0.033 mol) of phenylisocyanate was added, and it was refluxed for 3 hours. Most of the solvent was evaporated in vacuo, the residue was poured into ice water containing excess hydrochloric acid, and the resulting mixture was extracted with ether. The ether solution was extracted with 1N aqueous sodium hydroxide and the aqueous layer was washed with ether. It was reacidified and extracted with dichloromethane. Evaporation of the dichloromethane gave a residue which was triturated with ether to give 2.2 g of crystalline product, m.p. 207°-212°C dec. Recrystallization from methanol raised the m.p. to 217°-218.5°C dec.

EXAMPLE 2

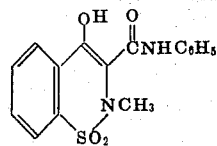

4-Hydroxy-2,N-Dimethyl-2H-1,2-Benzothiazine-3-Carboxanilide 1,1-Dioxide

To a slurry of 0.05 mol (2.1 g of a 57 percent mineral oil dispersion) of sodium hydride in 50 ml of tetrahydrofuran was added a solution of 6.6 g (0.02 mol) of 4-hydroxy-2-methyl-2H-1,2-benzothiazine-3-carboxanilide 1,1-dioxide in 150 ml of tetrahydrofuran, the temperature being maintained at 0° to 10°C during the addition. A solution of 2.6 g (0.021 mol) of dimethyl sulfate in 10 ml of tetrahydrofuran was added, the reaction mixture was allowed to slowly warm to room temperature, and then refluxed for two hours. Most of the solvent was removed and the residue was treated with ice water. The mixture was filtered and the filtrate was acidified with dilute hydrochloric acid. The resulting crude precipitate was recrystallized from methanol to give 3.9 g of crystalline product, m.p. 175°-178°C.

Anal. for $C_{17}H_{16}N_2O_4D$:
Calcd: C - 59.29 H - 4.68 N - 8.13 S - 9.31
Found: C - 59.01 H - 4.65 N - 8.04 S - 9.51

We claim:
1. A compound of the formula:

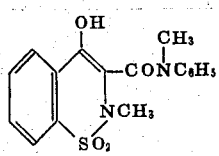

2. A process for the production of a compound of the formula:

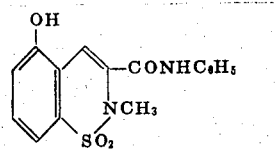

which comprises treating:
a. 2-methyl-2H-1,2-benzothiazine-4(3H)-one 1,1-dioxide with sodium hydride, and
b. treating the anion obtained in (a) with phenylisocyanate.

3. A process for the production of a compound of the formula:

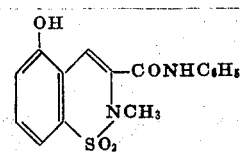

which comprises treating:
a. 2-methyl-2H-1,2-benzothiazine-4(3H)-one 1,1-dioxide with an alkyl magnesium halide, and
b. treating the anion obtained from (a) with phenyl isocyanate.

* * * * *